Patented Sept. 12, 1950

2,522,474

UNITED STATES PATENT OFFICE 2,522,474

TREATMENT OF ZINC SURFACES

George R. Waitkins and Richard S. Shutt, Columbus, Ohio, assignors to Battelle Memorial Institute, Columbus, Ohio, a corporation of Ohio No Drawing. Application July 2, 1942,
Serial No. 449,498

1 Claim. (Cl. 148—6.24)

Our invention relates to the treatment of zinc surfaces. It has to do, more particularly, with the production of coatings on zinc or zinc-base alloy surfaces and on galvanized surfaces. More specifically, it relates to the production of decorative and corrosion-inhibiting coatings on zinc, zinc-base alloy, and galvanized surfaces by treating such surfaces with solutions containing selenium or tellurium.

The use of other chemical matter in the production of coatings on zinc surfaces is well known in the art. Phosphate, chromate, molybdate and copper solutions have been used. However, these solutions may fail in the production of one or more of the following attributes of a desirable coating: (1) A pleasing decorative appearance, (2) Resistance to atmospheric corrosion, (3) Adhesion of chemical film, and (4) The improvement of the adhesion of paint and other film.

One of the objects of our invention is to produce decorative coatings on zinc, zinc-base alloy or galvanized surfaces by treating the surface to be coated with solutions containing selenium or tellurium.

Another object of our invention is to produce decorative coatings on zinc, zinc-base alloy or galvanized surfaces which will also resist corrosion.

A further object of our invention is to produce coatings on zinc, zinc-base alloy or galvanized surfaces which will firmly adhere to such surfaces.

Still another object of our invention is to produce coatings on zinc, zinc-base alloy and galvanized surfaces which will improve the adherence of paint and other films to such surfaces.

We have found that attractive coatings can be produced on zinc surfaces by treating such surfaces with aqueous solutions containing selenium or tellurium. Any ionizable compound of selenium or tellurium may be used in the treating solution. The amount of the selenium or tellurium compound employed in the solution may range from effective amounts up to the limit of the solubility of the compound. The amount of selenium or tellurium compound required will depend upon the temperature of the solution and the period of treatment of the surface.

We have found that attractive coatings can be produced on galvanized surfaces by dipping in aqueous solutions containing selenium or tellurium. Colors, such as yellow, green, scarlet and purple with a pleasing spangled effect have been produced on galvanized surfaces. The results obtained depend upon the composition and the temperature of the solution and the time during which the article remains in contact with the solution.

These films are very adherent and are beneficial in inhibiting zinc carbonate chalking (corrosion) on outdoor exposure. For indoor decorative use, we prefer to apply a coating of colorless nitrocellulose or other lacquer in order to retain the original color and design over longer periods of time. Colored lacquers may also be applied to obtain other novel effects.

In producing these coatings, either acid or alkaline baths may be employed. The acid bath may contain any ionizable compound of selenium or tellurium with or without additional agents. For example, selenium dioxide may be employed in the bath with or without oxidizing agents such as nitric acid, perchloric acid, sodium chromate, potassium chromate, sodium dichromate and potassium dichromate. Similarly, the alkaline bath may contain any ionizable compound of selenium or tellurium with or without additional agents. For example, selenium dioxide or tellurium dioxide may be employed with or without oxidizing agents such as potassium ferricyanide, sodium ferricyanide, potassium-sodium ferricyanide, sodium perborate and potassium perborate or with an addition agent such as sodium ferrocyanide. Other examples of selenium or tellurium baths are: $Na_2SeO_3$, $Na_2TeO_3$, $K_2SeO_3$, $K_2TeO_3$, $(NH_4)_2SeO_3$, $(NH_4)_2TeO_3$, The use of acid baths is illustrated by the data in Table I which follows:

TABLE I

*Production of decorative coatings on galvanized iron acid baths*

| Code No. | Bath Used [1] | Time of Immersion | Bath Temperature °C. | Subsequent Treatment | Color Effect Produced |
|---|---|---|---|---|---|
| 1 | (a) | 15-30 secs | 25-30 | None | Yellow Brass. |
| 2 | (a) | 1-2 min | 25-30 | do | Reddish Brass (Light). |
| 3 | (a) | 2-20 secs | 70-80 | do | Orange and Gray. |
| 4 | (b) | 3-5 min | 25-30 | do | Iridescent Brass. |
| 5 | (b) | 1-2 min | 60-70 | do | Iridescent red and blue. |
| 6 | (c) | 5-20 secs | 50-60 | do | Brassy Red (Dark). |
| 7 | (c) | 1 min | 60 | do | Copper-Oxide Red. |
| 8 | (a), (b), (c) | Variable | Variable | Heated Specimens at 120-150° C. for 1-3 min. | Gray-Green to Deep Purple. |

[1] Composition of Baths Used for Immersion.

(a)
Selenium dioxide _____ grams __ 10
Sodium dichromate ___ do ____ 10
Sulfuric acid _____ cc __ 10
Water _____ cc __ 400-1000

(b)
Selenium dioxide _____ grams __ 10
Sulfuric acid _____ cc __ 10
Water _____ cc __ 400-1000

(c)
Selenium dioxide _____ grams __ 10
Sodium dichromate ___ do ____ 5
Phosphoric acid _____ cc __ 10
Water _____ cc __ 400-1000

Table II, which follows, lists some of the alkaline baths which are effective for producing coatings on galvanized sheet, with variations in color from jet black to all the primary colors of the rainbow:

TABLE II

*Production of decorative coatings on galvanized iron alkaline baths*

| Code No. | Bath Used [1] | Time of Immersion | Bath Temperature °C. | Subsequent Treatment | Color Effect Produced |
|---|---|---|---|---|---|
| | | Minutes | | | |
| 9 | (d) | 3-5 | 50-130 | None | Pale Green and Pink. |
| 10 | (d) | 5-15 | 50-130 | do | Uniform Yellow-Green. |
| 11 | (e) | 1-5 | 50-130 | do | Glossy Blue-Black. |
| 12 | (f) | 5-15 | 50-130 | do | Slate Blue and Black. |
| 13 | (f) | 1-5 | 50-130 | do | Glossy Jet Black. |
| 14 | (g) | 3-5 | 50-130 | do | Sky Blue and Pale Brown. |
| 15 | (g) | 5-15 | 50-130 | do | Gold, Violet and Green. |
| 16 | (g) | 15-25 | 50-130 | do | Peacock Green Predominating. |

[1] Composition of baths used for immersion:

(d)
Selenium _____ grams __ 5-10
Sodium hydroxide _____ do ____ 30
Water _____ cc __ 300-500

(e)
Selenium dioxide _____ grams __ 10
Potassium ferricyanide ____ do ____ 20
Sodium hydroxide _____ do ____ 20
Water _____ cc __ 300-500

(f)
Tellurium dioxide _____ grams __ 10
Potassium ferricyanide ____ do ____ 20
Sodium hydroxide _____ do ____ 20
Water _____ cc __ 300-500

(g)
Selenium dioxide _____ grams __ 10
Sodium ferrocyanide _____ do ____ 20
Sodium hydroxide _____ do ____ 20
Water _____ cc __ 300-500

Instead of the ferricyanides mentioned above, other alkali ferricyanides may be employed. Also, instead of sodium ferrocyanide, other alkali ferrocyanides may be employed.

In general, when the alkaline baths are employed, longer coating periods are required than when the acid baths, previously referred to, are employed. However, as mentioned previously, the actual coating time may be varied over wide limits in order to obtain various decorative effects. Also, unlike the coatings of reddish elemental selenium deposited from acid solutions, the coatings resulting when alkaline baths are employed seem to result from actual compound formation between the zinc and the selenide or selenite or between the zinc and the telluride or tellurite which is present in these basic solutions.

The composition of the baths listed in Tables I and II is specific only in that the presence of selenium or of tellurium is required. For example, immersion of galvanized sheet in a solution of sulfur in aqueous sodium hydroxide results in slight etching and practically no color development, while an equivalent basic solution of selenium rapidly produces greenish yellow coatings. Solutions of sodium ferrocyanide and sodium hydroxide fail to color the galvanized surface, but similar solutions containing selenium dioxide give brilliant green and red colored surfaces. Solutions containing potassium ferricyanide and sodium hydroxide give dirty black non-adherent coatings, while the presence of selenium dioxide or tellurium dioxide permits the formation of glossy, jet black, and bluish black coatings which are hard and very adherent.

The following three examples illustrate additional novel effects which can be obtained by the employment of our invention.

*Example I.*—Pleasing stippled effects can be obtained by first producing a fairly heavy coating of selenium on galvanized sheet by immersion in acid baths containing selenium dioxide and then partially removing this selenium film by a short immersion in warm or cold 10% sodium hydroxide solution. The selenium is preferentially removed from certain crystal faces while a greenish-gray coating is left on the remaining areas. The denuded areas have a brilliant silvery sheen and produce an impression of depth in the surface. For decorative purposes, these stippled articles can also be coated with transparent lacquers containing various organic dyes thereby producing other attractive color effects. Other alkaline baths may be employed for the second immersion.

Other novel effects may be obtained by first coating the surface in an alkaline bath containing selenium or tellurium and, subsequently, partially removing this coating by treating with an acidic solution, such as a 10% solution of hydrochloric acid. Sulfuric acid and nitric acid solutions may also be employed.

*Example II.*—Coatings resembling ivory and mother of pearl can be obtained by the following method: Galvanized articles are immersed for from 2-5 minutes at 85-95° C. in a bath containing 10 grams of selenium dioxide, 20 grams of potassium ferricyanide, and 20 grams of sodium hydroxide per liter of solution. The articles are then exposed to the air for 15-30 seconds and, finally, immersed in the alkaline selenium dioxide-ferricyanide bath for an additional 30-60 seconds. Other alkaline selenium or tellurium-containing baths may be employed.

*Example III.*—The beautiful iridescent red and green coatings obtained by dipping galvanized iron in ammonium molybdate solutions (Iris baths) can be improved in respect to adhesion and to film pliability by using a combination of molybdate, ferricyanide, and selenite in warm sodium hydroxide solutions. Immersion for 15 minutes at 90-95° C. in a solution containing 30 grams of selenium dioxide, 60 grams of potassium ferrocyanide, 60 grams of sodium hydroxide and 15 grams of ammonium molybdate per liter of solution produces brilliant red and green films which have superior hardness, adhesion, and pliability in comparison with films prepared by dipping in the standard Iris baths. Instead of ammonium molybdate, sodium molybdate, potassium molybdate or other alkali molybdates may be employed.

Two hundred galvanized iron panels were surface treated with a variety of selenium and tellurium containing baths for evaluation as to corrosion resistance and utility as a paint base on outdoor exposure. Approximately one-third of these panels were sprayed with two coats of a black alkyd enamel. The remainder were exposed without further treatment so as to determine the value of these chemically treated surfaces in preventing corrosion of the zinc surface (zinc carbonate chalking). Included among the twenty-seven different treatments which were used for coating these various panels were chemical dips in solutions containing selenium and tellurium and immersion in control solutions, and others well known to the art, which contained various copper, arsenic, chromium and molybdenum compounds but no selenium or tellurium. The panels were placed on outdoor exposure racks in an industrial atmosphere.

Periodic inspections indicated that the selenium and tellurium films were effective in preventing the formation of white zinc carbonate while the panels treated with the control solutions without selenium or tellurium acquired an unattractive gray appearance.

Observations at the end of one and one-half years' exposure showed the paint to be peeling badly on the untreated galvanized iron, and on the panels coated with the molybdate, arsenic, and copper solutions. The paint films on the selenium and the tellurium coated panels were all good with the exception of those on the panels prepared by immersion in solutions of selenium dioxide and sulfuric acid without dichromate or phosphate additions. All other selenium-treated panels showed unimpaired paint films.

Selenium-coated galvanized iron panels were given a ten-day continuous exposure to a 20% salt spray and their corrosion resistance was compared with that of panels treated in phosphate, chromate, molybdate, and copper solutions, exposed under the same conditions. Daily visual examinations indicated that the selenium coatings, deposited from both the acid and the alkaline baths, were as good in most cases as the best of the other coatings, in preventing corrosion of zinc under these conditions. Corrosion of iron along the exposed edges was very marked in the copper-plated panels, while selenium, phosphate, molybdate, and chromate coatings were much superior in this respect.

Another series of selenium-coated galvanized iron panels was given a chromate sealing treatment and exposed to the salt spray test. The chromate sealing treatment is well known to the art and consists of treating the surface in a 15% sodium dichromate solution for from 15-30 minutes at about 90° C. The salt spray test showed that, under these conditions, the combination of the selenium treatment plus the chromate sealing treatment gave improved corrosion resistance over that obtained by the use of either treatment by itself. Other similar sealing treatments using phosphates, fluorides and silicates may be employed.

The relative adhesion of different kinds of paints on selenium-treated galvanized iron after exposure for one year to an industrial atmosphere was also evaluated. In these tests a series of selenium-treated panels, and control panels without treatment, were sprayed with separate coatings of red barn paint, outside white paint, aluminum pigmented paint and an outside black paint. All untreated panels showed peeling of paint along test scratches while the paint films on selenium-treated panels were not impaired under similar conditions.

Similarly, the bonding of resin, rubber, and other films and coatings to zinc, zinc-base alloy and galvanized surfaces is improved by treating the surfaces to be coated with the selenium or tellurium-containing solutions.

It will be apparent from the above description that decorative and corrosion-inhibiting coatings are produced on zinc, zinc-base alloy and galvanized surfaces according to our invention by employing baths containing selenium or tellurium. It will also be apparent that other agents may be added to the selenium and tellurium-containing baths. The treating time and the bath composition and temperature may be varied over wide limits in order to obtain various novel effects.

Various other advantages will be apparent from the preceding description and the following claim.

In the following claim, where we refer to "zinc" surfaces, it is to be understood that we also intend to cover zinc-base alloy surfaces and galvanized surfaces.

Having thus described our invention, what we claim is:

A method of treating a zinc surface which comprises first treating said surface with an alkaline aqueous solution containing a sufficient amount of a dissolved ionizable compound of an element selected from the group consisting of selenium and tellurium to produce an adherent, colored coating on said zinc surface and subsequently treating said coating with a mineral acid solution.

GEORGE R. WAITKINS.
RICHARD S. SHUTT.

REFERENCES CITED

The following references are of record in the file of this patent:

UNITED STATES PATENTS

| Number | Name | Date |
|---|---|---|
| 1,308,092 | Mathers | July 1, 1919 |
| 1,359,972 | Edison | Nov. 23, 1920 |
| 1,719,930 | Gray | July 9, 1929 |
| 1,723,067 | Pacz | Aug. 6, 1929 |
| 1,867,959 | Winter | July 19, 1932 |
| 1,961,030 | Dunstan | May 29, 1934 |
| 2,010,870 | Lindblad | Aug. 13, 1935 |
| 2,018,388 | Tosterud | Oct. 22, 1935 |
| 2,186,085 | Wein | Jan. 9, 1940 |
| 2,193,246 | Chace | Mar. 12, 1940 |
| 2,266,922 | Thompson et al. | Dec. 23, 1940 |
| 2,276,353 | Thompson | Mar. 17, 1942 |
| 2,282,511 | Bradley | May 12, 1942 |
| 2,322,208 | Loose | June 22, 1943 |
| 2,408,116 | Von Hippel | Sept. 24, 1946 |

FOREIGN PATENTS

| Number | Country | Date |
|---|---|---|
| 525,664 | Germany | May 27, 1931 |

OTHER REFERENCES

Chemical Abstracts, vol. 29 (1935), page 5029[1].